Jan. 18, 1938.　　　　J. A. EADES　　　　2,105,589
HOPPER DISCHARGE APPARATUS
Filed June 8, 1937　　　2 Sheets-Sheet 1

Inventor
John A. Eades

Jan. 18, 1938.     J. A. EADES     2,105,589
HOPPER DISCHARGE APPARATUS
Filed June 8, 1937     2 Sheets-Sheet 2
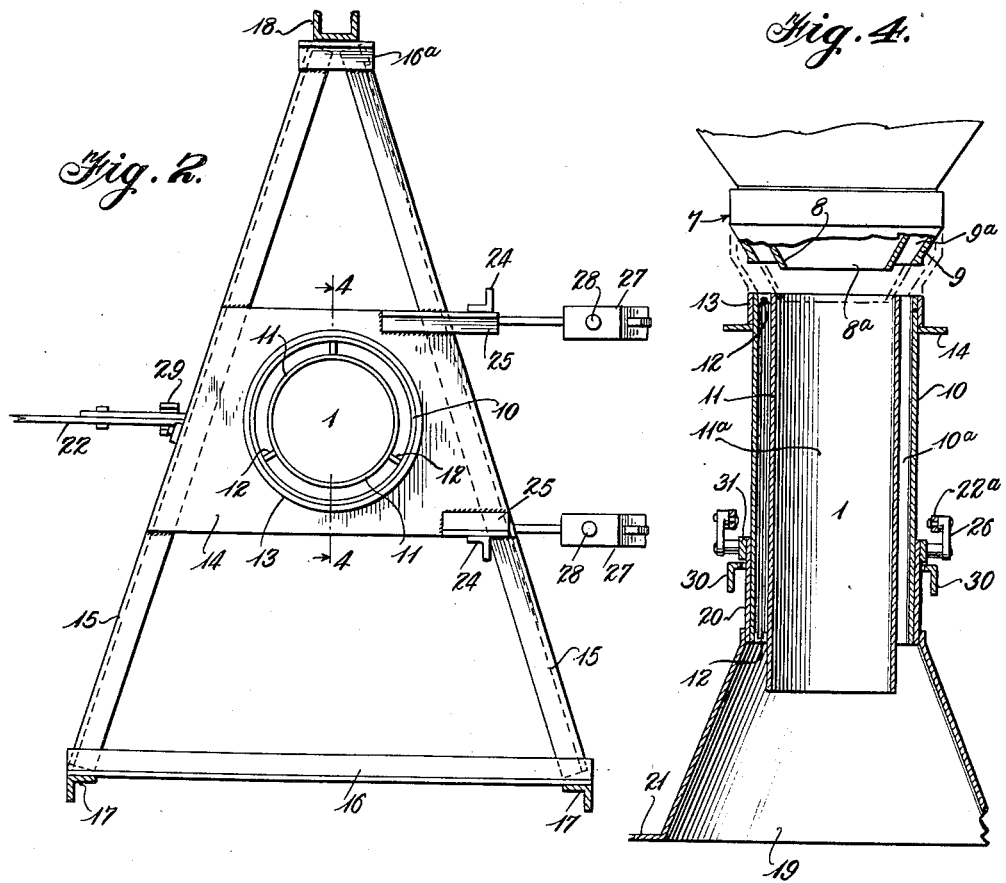
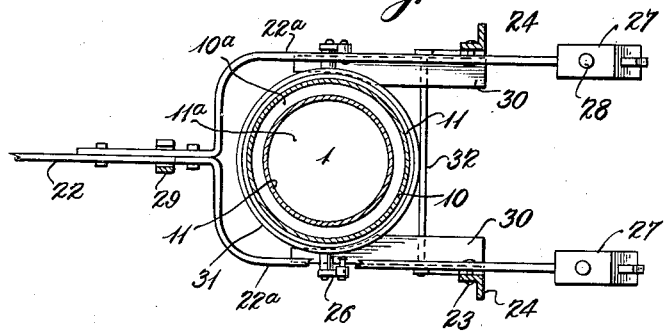
Inventor
John A. Eades Patented Jan. 18, 1938

2,105,589

UNITED STATES PATENT OFFICE 2,105,589

HOPPER DISCHARGE APPARATUS

John A. Eades, York, Pa., assignor to Read Machinery Company, Incorporated, York, Pa., a corporation of Pennsylvania Application June 8, 1937, Serial No. 147,126

7 Claims. (Cl. 226—109)

This invention relates to discharging means for overhead traveling hoppers, and more particularly aims to provide a discharge apparatus especially suitable for use with the type of dust-return hopper disclosed in my prior Patent No. 2,075,931, dated April 6, 1937.

In baking, chemical and other manufacturing plants in which pulverulent and granular materials are handled in bulk, it is common practice to employ a hopper adapted to travel upon an overhead trackway for transferring the materials from a source of supply to the various mixing or other processing machines located throughout the plant. The mixing machines are located below the trackway and in such relation thereto that when the hopper arrives in a position above a mixer, its discharge spout can be lowered into engagement with the charging opening of the mixer, the valve in the bottom of the hopper opened and a supply of material delivered into the mixer.

In connection with such type of hopper, means are sometimes afforded for conducting away the dust-laden air displaced from the interior of the mixer during the charging operation. In the improved form of hopper disclosed and claimed in the above-mentioned patent, the discharge spout comprises an inner material-discharge passageway and an outer dust-return passageway surrounding the first-mentioned passageway and venting to the top of the hopper, so that when the inlet at the top of the hopper is closed the suction created by the evacuation of the hopper and the compression of the air within the mixer by the incoming charge of material produces a strong current of air for returning to the hopper the dust developed by the delivery of material into the mixer.

While this form of hopper is satisfactory for use with large-scale mixers which stand high enough above the floor level to allow the spout of the hopper to be placed in direct communication with their charging openings, it is inadequate for the efficient transfer of materials from the hopper to the smaller sizes of mixers, such for example as spindle mixers of the open trough type, which lie too far below the hopper to be reached by the spout in its lowermost extended position.

It is therefore an object of the present invention to provide a discharge apparatus located in stationary elevated position below the trackway and having a material-discharge conduit and a dust-offtake conduit adapted respectively to cooperate with and form extensions of the material-discharge and dust-return passageways associated with the hopper.

More particularly the invention aims to provide a discharge apparatus comprising an inner material-discharge conduit and a surrounding dust-offtake conduit extending to a position near the floor level and both opening at their lower ends through a hood or dust cover which is capable of being lowered into closed relation with the open top of a portable mixer or similar apparatus. These conduits are so constructed and arranged to permit the lowering of the double walls defining the material-discharge and dust-return passageways of the spout into tight engagement therewith when the hopper is moved into servicing position above the discharge apparatus, so that the dust accompanying the flow of material into the mixer is swept upwardly through the dust-offtake conduit, and consequently through the registering dust-return passageway of the spout, and returned to the top of the hopper.

Another object of my invention is to provide a discharge apparatus of the above character in which the dust-offtake conduit, in contradistinction to the types of discharge apparatus now ordinarily employed in baking and chemical plants, is arranged so as to form an integral part of the material-discharge conduit and so located as to be practically immune from damage resulting from collisions through the careless handling of equipment by workmen in the neighborhood of the mixer.

A further object of my invention is to provide in a discharge apparatus of the above character simple and efficient mechanism adapted to be manually actuated for lowering and raising the hood into and out of engagement with a portable mixer stationed below the apparatus, this mechanism being located in overhead out-of-the-way position to avoid obstructing the movement of the mixer under and out from under the hood.

Other objects and advantages will be apparent from the following detailed description of a preferred embodiment of my invention, reference being had to the annexed drawings in which:

Figure 2 is a horizontal cross-section of the discharge apparatus taken on the line 2—2 of Fig. 1;

Figure 3 is a horizontal cross-section of the discharge apparatus taken on the line 3—3 of Fig. 1; and Fig. 4 is a vertical cross-section of the discharge apparatus taken on the line 4—4 of Fig. 2.

Figure 1:
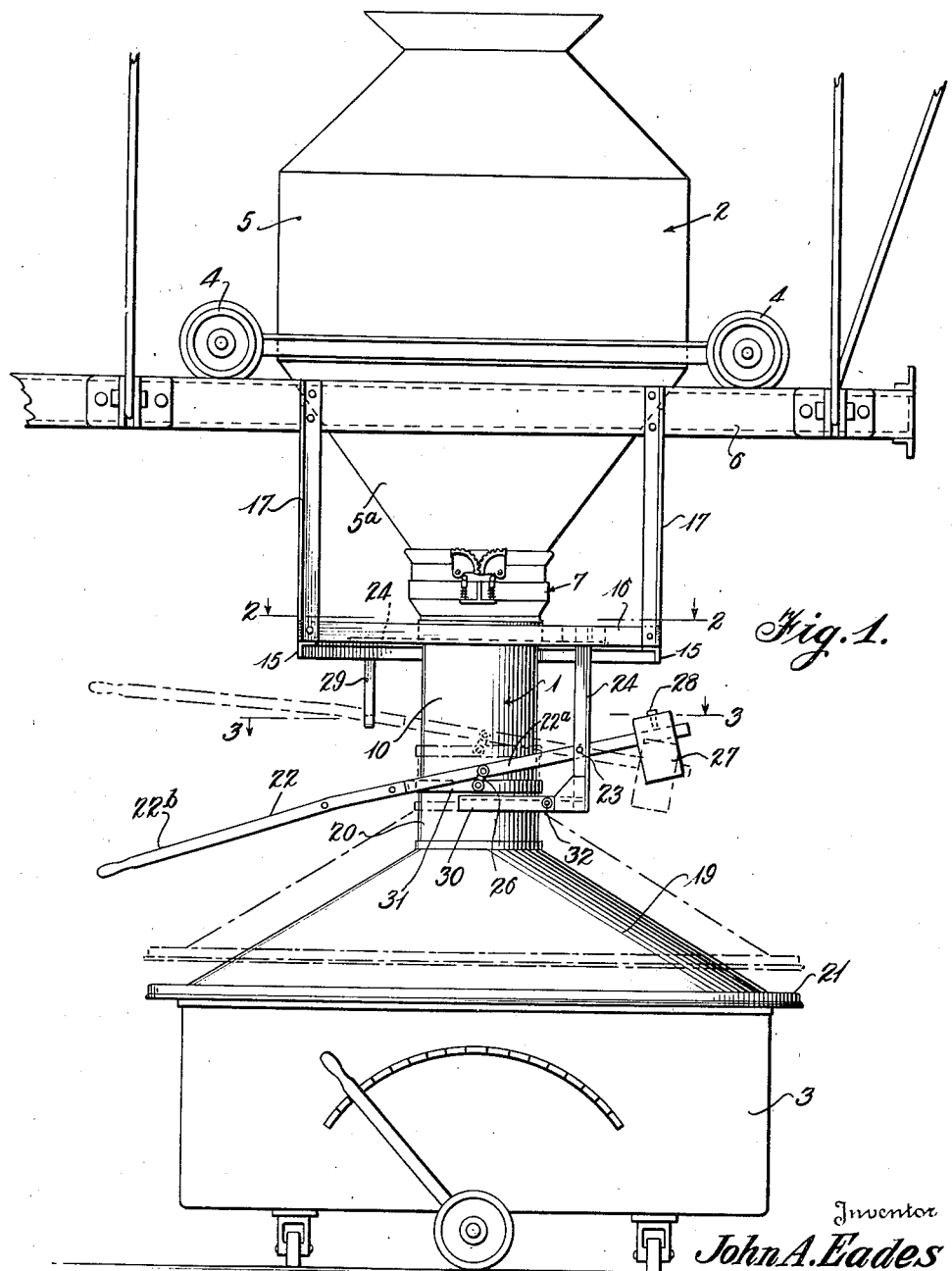
Figure 1 is a view in side elevation of a discharge apparatus embodying the invention arranged below a trackway for an overhead traveling hopper for transferring material from the hopper to a portable spindle mixer situated below the discharge apparatus.

Referring now more particularly to the drawings, Fig. 1 illustrates a discharge apparatus 1 arranged in material-transfer position with respect to a traveling hopper 2 and a spindle mixer 3 of the open trough type. The hopper as described in more detail in my Patent No. 2,075,931, consists in general of a receptacle 5 mounted upon rollers 4 adapted to travel upon an overhead trackway formed of a pair of rails 6. The receptacle has a downwardly converging lower end 5a which projects into the space between the rails 6 and terminates in a vertically slidable spout 7.

The spout, as best shown in Fig. 4, comprises an inner wall 8 and an outer wall 9 which latter is located in concentric spaced relation to the inner wall. The inner wall defines a discharge passageway 8a for material issuing from the hopper when the gates (not shown) normally closing the outlet at the bottom of the hopper are opened, while the outer wall 9 defines a dust-return passageway 9a venting to the top of the hopper for dust accompanying the discharge of material from the hopper. The spout may be raised and lowered by means of a crank (not shown) which also controls the opening and closing of the gates in the outlet at the bottom of the hopper.

The discharge apparatus 1, as more clearly shown in the cross-sectional view of Fig. 4, is composed of an outer conduit 10 and an inner conduit 11 supported in spaced concentric relation thereto by means of spacer clips 12 located adjacent the upper and lower ends of the conduits. The inner conduit 11 constitutes a material-discharge passageway 11a while the outer conduit in cooperation with the inner conduit defines a surrounding dust-offtake passageway 10a. The upper ends of the conduits terminate in the same horizontal plane while the lower end of the inner conduit extends a short distance below the outer conduit so as to avoid interference with the upward sweep of air into the dust-offtake passageway by the column of material flowing from the inner conduit.

These conduits are of such size and arrangement that when the spout of the hopper is in lowered position, as indicated in dotted lines in Fig. 4, the inner and outer walls 8 and 9 of the spout register with and circumferentially seal the upper ends of conduits 11 and 10 and form in effect continuations of the dust-offtake and material-discharge passageways.

The conduits are stationarily supported in elevated position below the hopper trackway by the following means: Encircling and fastened to the upper end of the outer conduit 10 is a hoop 13 which rests upon and is welded to a horizontal metal plate 14 provided with an opening through which the conduit extends. This plate adjacent its lateral edges rests upon and is fastened to a pair of convergent angle irons 15 forming part of a triangular shaped suspension frame. Connecting the spread ends of the angle irons 15 and bonded thereto as by welding is a cross-angle 16 while the apex of the triangular frame is reinforced by a short section of angle iron 16a as more clearly shown in Fig. 2. The frame is rigidly supported below the trackway by means of a pair of angle irons 17 projecting downwardly from one of the rails 6 and secured to the ends of the cross-angle 16 and also by a channel member 18 extending downwardly from the other of the pair of rails comprising a trackway and fastened to the shorter cross-angle 16a.

Mounted upon the lower end of the outer conduit 10 so as to be raised and lowered is a hood 19. This hood is provided at its upper end with a sleeve 20 which snugly encircles the outer conduit 10 so as to slide thereupon, and below this sleeve the hood is expanded outwardly and downwardly into dome shape so as to fit over and close the open top of the trough of a portable spindle mixer, as indicated at 3. The hood terminates at its lower end in an outwardly directed flange 21 designed to flatly and tightly seat upon the rim of the trough of the mixer.

For raising and lowering the hood there is provided a fork-shaped operating lever 22 (see Fig. 3) the two branches 22a of which straddle the conduit 10. These branches are each pivoted, as at 23, to a pair of angle irons 24 secured to and depending from anchor blocks 25 (constituted of short channel sections) bonded to plate 14 of the conduit-supporting frame. Links 26 pivotally connect the branches 22a of the fork-shaped lever to sleeve 20 at diametrically opposite points upon the sleeve. The operating lever 22 is extended to afford a handle 22b for manually moving the lever upwardly or downwardly.

The branches 22a of the fork are provided at their outer ends with weights 27 to counterbalance the weight of the hood, these weights being shiftable inwardly or outwardly along the forks and retained in their adjusted positions by means of set screws 28. When the hood is in raised position, as indicated in dotted lines in Fig. 1, the handle 22b may be engaged with a hook 29 secured to and depending from an angle 15 of the conduit-supporting frame.

To limit the downward movement of the hood a pair of horizontal bars 30 composed of angle irons are rigidly secured to the lower ends of the downwardly-reaching arms 24 and these bars extend to a position approximately tangent to the sleeve 20 but slightly out of contact therewith as best shown in Fig. 4. Upon the upper end of the sleeve is rigidly fastened a ring 31 which in the lowermost position of sliding movement of the sleeve abuts against the horizontal bars 30 and acts as a stop for the sleeve. The pair of bars 30 is rigidified and prevented from spreading by a tie rod 32 extending crosswise between the bars and slightly clearing the sleeve.

The operation of the hopper discharge apparatus described above will be readily apparent. With the hood 19 in elevated position a portable spindle mixer 3 into which material is to be delivered may be rolled beneath the hood and the handle 22b of the operating lever 22 unlatched from the hook 29 so as to allow the hood to lower under its own weight to cover the open top of the mixer trough, as shown in Fig. 1. The traveling hopper 2 either previously or subsequently having been rolled into suitable position above the discharge apparatus, the spout 7 of the hopper is lowered so that its inner and outer walls 8 and 9 engage respectively the upper ends of the inner and outer conduits 11 and 10 of the discharge apparatus, thus placing the material-discharge and dust-return passageways 8a and 9a of the spout into communication respectively with the material-discharge and dust-return passageways 11a and 10a of the discharge apparatus.

When through the opening of the outlet in the bottom of the hopper material is released from the hopper, it will flow downwardly through the material-discharge conduit of the discharge apparatus into the mixer and the dust accompanying its discharge will be carried off by the air forcibly displaced from the mixer by way of the dust-offtake conduit 10 and the dust-return passageway 9a of the spout and delivered into the top of the hopper.

After the charging of the mixer has been completed, the hood 19 is raised by shifting the lever 22 upwardly and again engaging it with its hook 29. The portable mixer may then be rolled out from beneath the hood and moved to any desired location in the plant.

It will be apparent that various changes in structure and design in the preferred form of the discharge apparatus described above may be made without departing from the spirit of my invention.

I claim:

1. The combination with a hopper having a vertically slidable spout composed of a pair of spaced inner and outer walls defining material-discharge and dust-return passageways, of a discharge apparatus comprising a material-discharge conduit, a dust-offtake conduit surrounding the material-discharge conduit and located in spaced relation thereto, said conduits being designed to communicate with the material-discharge and dust-return passageways of the hopper when the spout is in lowered position and means stationarily supporting said conduits in elevated position.

2. The combination with a hopper having a vertically slidable spout composed of a pair of spaced inner and outer walls defining material-discharge and dust-return passageways, of a discharge apparatus comprising a material-discharge conduit, a dust-offtake conduit surrounding the material-discharge conduit and located in spaced relation thereto, said conduits being designed to communicate with the material-discharge and dust-return passageways of the hopper when the spout is in lowered position, a suspension frame stationarily supporting said conduits in elevated position, a hood slidably mounted upon the lower end of the dust-offtake conduit and a manually-operable lever pivoted upon the suspension frame for raising and lowering the hood.

3. A discharge apparatus for use in connection with a hopper having a vertically slidable spout composed of a pair of spaced inner and outer walls defining material-discharge and dust-return passageways, said discharge apparatus comprising a material-discharge conduit, a dust-offtake conduit surrounding the material-discharge conduit and located in spaced relation thereto, said conduits being designed to communicate with the material-discharge and dust-return passageways of the hopper when the spout is in lowered position, means stationarily supporting said conduits in elevated position, a hood slidably mounted upon the lower end of the dust-offtake conduit and means for raising and lowering the hood.

4. The combination with a traveling hopper, an overhead trackway upon which the hopper is mounted for travel, said hopper having a vertically slidable spout composed of a pair of concentrically spaced walls defining material-discharge and dust-return passageways, of a discharge apparatus comprising a material-discharge conduit, a dust-offtake conduit surrounding the material-discharge conduit and located in spaced relation thereto, a suspension frame for stationarily supporting the conduits with their upper ends located a relatively short distance below the path of the bottom of the hopper so as to permit lowering the spout to place the material-discharge and dust-return passageways thereof in communication with the corresponding conduits of the discharge apparatus, a hood slidably mounted upon the lower end of the dust-offtake conduit and designed in its lowered position to engage and close the open top of a portable receptacle adapted to be positioned below the conduits and a manually-operable lever pivoted to the frame and to the hood for raising and lowering the hood into and out of engagement with the receptacle.

5. A discharge apparatus for use in connection with a hopper having a vertically slidable spout composed of a pair of spaced inner and outer walls defining material-discharge and dust-return passageways, said discharge apparatus comprising a material-discharge conduit, a dust-offtake conduit surrounding the material-discharge conduit and located in spaced relation thereto, said conduits being designed to communicate with the material-discharge and dust-return passageways of the hopper when the spout is in lowered position, means stationarily supporting said conduits in elevated position, a hood slidably mounted upon the lower end of the dust-offtake conduit and means for raising and lowering the hood, said hood raising and lowering means comprising a forked operating lever having branches straddling the outer conduit, arms extending downwardly from said conduit supporting means, means pivotally connecting the branches to said arms so that the lever may be raised and lowered, and links pivotally connecting said branches and said hood.

6. The combination with a hopper having a vertically slidable spout composed of a pair of spaced inner and outer walls defining material-discharge and dust-return passageways, of a discharge apparatus comprising a material-discharge conduit, a dust-offtake conduit approximately concentric with the material-discharge conduit and located in spaced relation thereto, said conduits being designed to communicate with the material-discharge and dust-return passageways of the hopper when the spout is in lowered position and means stationarily supporting said conduits in elevated position.

7. A discharge apparatus for use in connection with a hopper having a vertically slidable spout composed of a pair of spaced inner and outer walls defining material-discharge and dust-return passageways, said discharge apparatus comprising a material-discharge conduit, a dust-offtake conduit approximately concentric with the material-discharge conduit and located in spaced relation thereto, said conduits being designed to communicate with the material-discharge and dust-return passageways of the hopper when the spout is in lowered position, means stationarily supporting said conduits in elevated position, a hood slidably mounted upon the lower end of one of the conduits and means for raising and lowering the hood.

JOHN A. EADES.